US011430135B2

United States Patent
Wang et al.

(10) Patent No.: US 11,430,135 B2
(45) Date of Patent: Aug. 30, 2022

(54) CAPTURE-BALL-BASED ON-BALL POINT DISTRIBUTION METHOD AND MOTION-POSTURE RECOGNITION METHOD, SYSTEM, AND APPARATUS

(71) Applicant: SHENZHEN REALIS MULTIMEDIA TECHNOLOGY CO., LTD., Shenzhen (CN)

(72) Inventors: Yue Wang, Shenzhen (CN); Qiuzi Xu, Shenzhen (CN)

(*) Notice: Subject to any disclaimer, the term of this patent is extended or adjusted under 35 U.S.C. 154(b) by 458 days.

(21) Appl. No.: 16/470,749

(22) PCT Filed: Jun. 12, 2018

(86) PCT No.: PCT/CN2018/090784
§ 371 (c)(1),
(2) Date: Jun. 18, 2019

(87) PCT Pub. No.: WO2019/196192
PCT Pub. Date: Oct. 17, 2019

(65) Prior Publication Data
US 2021/0343024 A1  Nov. 4, 2021

(30) Foreign Application Priority Data

Apr. 11, 2018 (CN) .......................... 201810320884.7
Apr. 11, 2018 (CN) .......................... 201810322184.1

(51) Int. Cl.
*G06T 7/215* (2017.01)
*G06T 7/292* (2017.01)
(Continued)

(52) U.S. Cl.
CPC .............. *G06T 7/215* (2017.01); *G06T 7/248* (2017.01); *G06T 7/292* (2017.01); *G06T 7/74* (2017.01); *G06V 40/20* (2022.01); *G06T 2200/04* (2013.01)

(58) Field of Classification Search
CPC ......... G06T 7/215; G06T 7/248; G06T 7/292; G06T 7/74; G06T 2200/04; G06K 9/00335
See application file for complete search history.

(56) References Cited

U.S. PATENT DOCUMENTS

2014/0141900 A1   5/2014 Rose

FOREIGN PATENT DOCUMENTS

| CN | 106774365 A | 5/2017 |
| CN | 107067424 A | 8/2017 |
| CN | 107767424 A | 3/2018 |

OTHER PUBLICATIONS

Theobalt, C., Albrecht, I., Haber, J., Magnor, M. and Seidel, H.P., 2004. Pitching a baseball: tracking high-speed motion with multi-exposure images. In ACM SIGGRAPH 2004 Papers (pp. 540-547) (Theobalt).*

(Continued)

*Primary Examiner* — Zhitong Chen (57) ABSTRACT

A capture-ball-based on-ball point distribution method, and a motion-posture recognition method, system, and apparatus are provided. The on-ball point distribution method is used for optical motion capture, and includes dividing a surface of a ball into a plurality of sub-regions, and distributing reflective marking points in the plurality of sub-regions such that a distribution of distance values between any two reflective marking points is concentrated. The reflective marking points are used for the optical motion capture of the ball. According to the on-ball point distribution method and the motion-posture recognition method, system, and apparatus, misrecognition caused by matching errors of the reflective marking points and increased coordinate errors of the spherical center can be effectively avoided. As such, the recognition degree of the capture ball in the system is improved.

9 Claims, 7 Drawing Sheets

(51) Int. Cl.
  *G06T 7/73*  (2017.01)
  *G06T 7/246*  (2017.01)
  *G06V 40/20*  (2022.01)

(56) References Cited

OTHER PUBLICATIONS

Neilson, P., Jones, R., Kerr, D. and Sumpter, C., 2004. An image recognition system for the measurement of soccer ball spin characteristics. Measurement Science and Technology, 15(11), p. 2239.*
World Intellectual Property Organization (WIPO) International Search Report and Written Opinion for PCT/CN2018/090784 dated Jan. 15, 2019 11 Pages.

* cited by examiner

CAPTURE-BALL-BASED ON-BALL POINT DISTRIBUTION METHOD AND MOTION-POSTURE RECOGNITION METHOD, SYSTEM, AND APPARATUS

CROSS-REFERENCE TO RELATED APPLICATIONS

This application is a national phase entry under 35 U.S.C. § 371 of International Application No. PCT/CN2018/090784, filed on Jun. 12, 2018, which claims the priority and benefits of Chinese Patent Application Serial Nos. CN201810322184.1, filed on Apr. 11, 2018, and CN201810320884.7, filed on Apr. 11, 2018, the entire content of all of which is incorporated herein by reference.

FIELD OF THE INVENTION

The present invention relates to the field of optical motion capture technology and, more particularly, relates to a capture-ball-based on-ball point distribution method, and a motion-posture recognition method, system, and apparatus.

BACKGROUND

In current optical motion capture systems, the motion-posture recognition and trajectory tracking for a target object is typically implemented by capturing the motion trajectories of reflective markers (referring to markers with the surfaces covered by special reflective materials, having common shapes including spherical shapes, hemispherical shapes, etc., and often used for capturing moving objects). Usually, a plurality of reflective markers configured on a capture object is combined into a rigid body that can be captured (here, the rigid body refers to an object that, when moving and after being subjected to a force, the shape and the size are unchanged and the relative positions of the internal points are unchanged, and is an ideal model), and each rigid body corresponds to a certain target area on the capture object. When tracking the capture object, different target areas of the capture object are mainly distinguished by identifying different rigid bodies on the capture object. This method can well recognize the motion postures of most target objects, such as hand and head of human body, various simulation props in games, etc. However, to capture some target objects whose movement mode is not fixed, such as balls, the method may not work. Because the capture objects have random motion in all directions in space, the direction of motion cannot be controlled, and each part may possibly collide with the contact surface, causing damages to the rigid body.

At present, by sticking some reflective stickers on the surface of a capture ball in the category of balls, the capture ball is transformed into a capturable rigid body. As such, the motion posture can be recognized, and the effect of tracking the trajectory of the capture ball can be achieved. The method has the following disadvantages.

First, when a capture ball is recognized in the rigid body manner, since a lot of reflective stickers are distributed on the capture ball to configure a large number of reflective markers, in order to comprehensively recognize the motion posture of the capture ball, in a later process of posture recognition and trajectory tracking, it is required to traverse the three-dimensional coordinates of each reflective marker, and thus the amount of calculation is tremendous, which may greatly affect the effect of real-time motion-posture recognition and trajectory tracking of the capture ball.

Second, the self-structure of the capture ball has a difference in size. A ball with a relatively large diameter will cause unpredictable blocking of the reflective sticker during the movement process, thereby affecting the capturing process and resulting in poor motion-posture recognition.

BRIEF SUMMARY OF THE INVENTION

The technical problem mainly solved by the present invention is how to configure the reflective marking points on a capture ball and how to perform the motion-posture recognition on the configured capture ball to enhance the recognition effect of the capture ball in the process of posture recognition and trajectory tracking.

According to a first aspect, the present application provides an on-ball point distribution method for optical motion capture, including the following steps: dividing the surface of the ball into a plurality of sub-regions; and distributing reflective marking points in the plurality of sub-regions such that the distribution of the distance values between any two reflective marking points is concentrated, and the reflective marking points are used for optical motion capture of the ball.

According to a second aspect, the present application provides a capture ball for optical motion capture. A plurality of reflective marking points is distributed on the capture ball, and each reflective marking point is obtained through the on-ball point distribution method disclosed in the first aspect.

According to a third aspect, the present application provides an optical motion capture system, including: the capture ball disclosed in the above second aspect; a plurality of cameras, configured to capture motion images of the capture ball in a motion space during the movement process; a motion-posture recognition apparatus, communicatively coupled to the plurality of cameras, and configured to perform motion-posture recognition on the capture ball based on the motion images.

According to a fourth aspect, the present application provides a motion-posture recognition method for a capture ball. The surface of the capture ball is configured to include a plurality of reflective marking points that is uniformly distributed, and the method includes the following steps:

acquiring the three-dimensional coordinates of all the reflective marking points of the capture ball in the motion space, and identifying a plurality of matching points of the capture ball, the matching points being reflective marking points on the capture ball;

acquiring the coordinates of the spherical center of the capture ball according to the three-dimensional coordinates of the plurality of matching points;

acquiring the motion-posture information of the capture ball in the motion space according to the three-dimensional coordinates of the plurality of matching points and the coordinates of the spherical center of the capture ball.

According to a fifth aspect, the present application provides a motion-posture recognition apparatus for a capture ball. The surface of the capture ball is configured to include a plurality of reflective marking points, and the apparatus includes:

a matching-point acquisition unit, configured to identify a plurality of matching points of the capture ball, and acquire the three-dimensional coordinates of each matching point, the matching point being a reflective marking point belonging to the capture ball;

a spherical-center-coordinates acquisition unit, configured to acquire the coordinates of the spherical center of the capture ball according to the three-dimensional coordinates of the plurality of matching points; and a posture-information acquisition unit, configured to acquire the motion-posture information of the capture ball in the motion space according to the three-dimensional coordinates of the plurality of matching points and the coordinates of the spherical center of the capture ball.

According to a sixth aspect, the present application provides a computer storage medium, including a program. The program can be executed by a processor to implement the method of the first aspect described above.

The effective results of the present application include the following.

The on-ball point distribution method, the capture ball, and the system for optical motion capture according to the above embodiments adopt a predetermined graphic combination to divide the surface of the ball, such that the surface of the ball demonstrates a uniform geometric distribution state, which is conducive to distributing reflective marking points of the ball at the apexes or the edge-midpoints of the geometric figures to form a capture ball that can be used for optical capture. The capture ball obtained using the on-ball point distribution method has the advantages of uniform point-distribution and small difference in the distances between the reflective marking points, such that when the optical capture system is used to recognize the motion posture of the capture ball, the system can quickly identify the reflective marking points on the capture ball, which help the system recognize and obtain the motion-posture information of the capture ball according to the displacement changes of the reflective marking points. Moreover, in the past, when recognizing a capture ball in the form of rigid bodies, at least 30 reflective marking points are required to form a rigid body of the capture ball, and thus ensure the stability of the motion-posture recognition process. As such, in a later process of capturing and recognizing the capture ball, the system needs to capture and track each reflective marking point, which is a very large amount of calculation for the capturing and tracking process of the rigid body, and is time consuming and unrealistic; however, when adopting the motion-posture recognition method and apparatus disclosed by the present application, it only requires to find 10 or even less of some reflective marking points on the capture ball to perform motion-posture recognition on the capture ball, thereby greatly reducing the calculation amount of the system and improving the calculation speed of the capturing and tracking process, such that while the real-time posture recognition effect of the capture ball is enhanced, convenience can also be brought to practical applications.

In addition, the motion-posture recognition method and apparatus of a capture ball according to the above embodiments acquire three-dimensional coordinates of all identifiable reflective marking points in the motion space, and match all the reflective marking points to obtain a plurality of matching points on the capture ball, such that the coordinates of the spherical center of the capture ball are calculated according to the three-dimensional coordinates of the matching points, and the motion-posture information of the capture ball in the motion space is then obtained through the three-dimensional coordinates of each matching point and the coordinates of the spherical center of the capture ball. Because in the process of acquiring the plurality of matching points on the capture ball, a method for matching the identifiable reflective marking points and the capture ball is added, the misidentification situation caused by matching errors of the reflective matching points is avoided when performing motion-posture recognition on the capture ball, which is conducive to improving the recognition degree of the capture ball in the system. Moreover, because an iterative algorithm for calculating the coordinates of a spherical center is introduced in the process of acquiring the coordinates of the spherical center of the capture ball, the finally-obtained coordinates of the spherical center can be very close to the actual coordinates of the spherical center of the capture ball, which improves the accuracy of acquiring the motion-posture information of the capture ball, and may further reduce the possibility of the appearance of the motion-posture misidentification situation. Furthermore, in the past, when recognizing a capture ball using the form of rigid bodies, at least 30 reflective marking points are required to form a rigid body of the capture ball, and thus ensure the stability of the motion-posture recognition process. At this time, the system needs to capture and track each reflective marking point, which is a very large amount of calculation for the capturing and tracking process of the rigid body, and is time consuming and unrealistic; however, when adopting the motion-posture recognition method and apparatus disclosed by the present application, it only requires to find 10 or even less matching points on the capture ball to perform motion-posture recognition on the capture ball, thereby greatly reducing the calculation amount of the system and improving the calculation speed of the capturing and tracking process, such that while the real-time posture recognition effect of the capture ball is enhanced, convenience can also be brought to practical applications.

DETAILED DESCRIPTION

The present invention will be further described in detail below with reference to the accompanying drawings. Similar elements in different embodiments adopt the numbers for related similar elements. In the following embodiments, many of the details are described in order to provide a better understanding of the application. However, those skilled in the art can easily understand that some of the features may be omitted in different situations, or may be replaced by other elements, materials, and methods. In some cases, some operations related to the present application are not shown or described in the specification. This is to avoid the core part of the present application being overwhelmed by excessive description. For those skilled in the art, detailed description of these related operations is not necessary, and they can fully understand the relevant operations according to the description in the specification and the general technical knowledge in the field.

In addition, the features, operations, or characteristics described in the specification may be combined in any suitable manner to form various embodiments. In the meantime, the steps or actions in the method description can also be subjected to a sequence change or adjustment in a manner that can be apparent to those skilled in the art. Therefore, the various sequences in the specification and the drawings are merely for the purpose of describing a particular embodiment, and are not meant to be necessary sequences unless otherwise stated that one of the sequences must be followed.

The serial numbers themselves for the components herein, such as "first", "second", etc., are only used to distinguish the described objects, and do not have any order or technical meaning. As used herein, "connected" or "coupled", unless otherwise specified, includes both direct and indirect connections (coupling).

The embodiments of the invention provide a motion-posture recognition method and an apparatus thereof for a capture ball, and aim to solve the problem of large calculation amount in the process of recognizing the motion posture of a capture ball according to the existing technology. The key to solve this problem is, on the one hand, uniformly distributing reflective marking points on the surface of a capture ball to form a capture ball with a uniform distribution of the points, and on the other hand, improving the motion-posture recognition mechanism to obtain a motion recognition apparatus that can quickly and accurately recognize the motion position of the capture ball. To this end, the present invention also provides an optical motion capture system to recognize motion postures of a capture ball using a motion-posture recognition apparatus.

Figure 1:
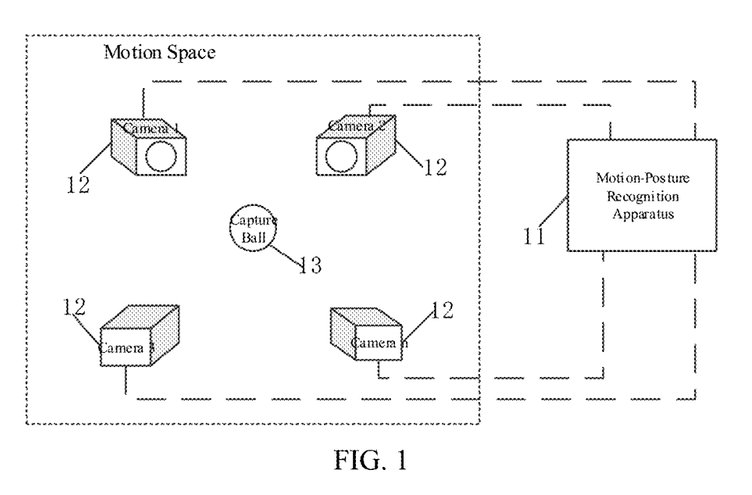
FIG. 1 illustrates a schematic structural view of an optical motion capture system.

Referring to FIG. 1, the optical motion capture system may include a motion-posture recognition apparatus 11, a plurality of cameras 12 (preferably using infrared cameras), and a capture ball 13. The number of the cameras 12 may be adjusted accordingly depending on the site size and the actual application. The plurality of cameras 12 may be distributed at a plurality of angles of the motion space to have an all-round detection effect on the capture ball, and each of the infrared cameras may be able to capture motion images of the capture ball 13 at a high speed in the motion space (the motion images often include pixels corresponding to the reflective marking points); the motion-posture recognition apparatus 11 may be communicatively coupled to each camera 12 for performing motion-posture recognition on the capture ball 13 according to the motion images captured by the camera 12; the capture ball 13 may need to be a ball with the surface configured to include a plurality of uniformly-distributed reflective marking points. Optionally, the reflective marking points on the surface of the capture ball may be distributed according to the apex positions of regular hexagonal figures on the surface of a soccer ball, or according to the edge-midpoint positions of the edges shared by any two regular hexagons on the surface of a soccer ball.

Figure 2:
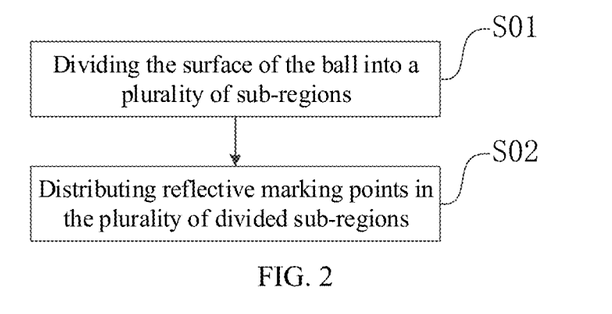
FIG. 2 illustrates a flowchart of an on-ball point distribution method for a capture ball.

In order to accurately understand the distribution pattern of the reflective marking points on the surface of the capture ball 13, an on-ball point distribution method of the capture ball will be explained. Referring to FIG. 2, the on-ball point distribution method for motion-posture capture may include steps S01-S02.

In step S01, the surface of the ball may be divided into a plurality of sub-regions. The specific concept is described as follows.

When the reflective marking points are distributed on the surface of the ball, in order to achieve the effect that the reflective marking points can be easily identified and are not blocked, the following conditions should be satisfied: (1) the reflective marking points should be ensured to distribute uniformly; (2) the number of reflective marking points should be as small as possible; (3) the number of the types of the distances between the reflective marking points should be as small as possible, or the distance values between any two reflective marking points should be concentrated. In order to achieve the above conditions, it may need to divide the spherical surface of the ball into a plurality of sub-regions with close areas, and distribute reflective marking points in the plurality of sub-regions, such that the distribution of the distance values between any two reflective marking points can be concentrated. Here, the so-called concentrated distribution of the distance values between reflective marking points can be measured by counting the number of occurrences of the distance values from a point to another point. For example, when there is a distance value from a point to another point reaches a preset value, it is considered that the distribution of the reflective marking points on the ball satisfies the condition.

By comparing the different geometric figures, the surface of a soccer ball is always composed of 20 regular hexagons and 12 regular pentagons, and the regular hexagons and regular pentagons are uniformly distributed. Therefore, the surface of the capture ball 13 may be divided according to the geometric figures of the surface of a soccer ball. Thereafter, the apex positions of the regular hexagonal figures of the surface of the capture ball 13 may be selected for point distribution, or the edge-midpoint positions of the non-adjacent edges of the regular hexagons may be selected for point distribution. As such, the purposes of distributing the reflective marking points uniformly on the surface of the capture ball 13, having less type of the distances between points, and centralizing the distribution of the distance values can be achieved.

Figure 3:
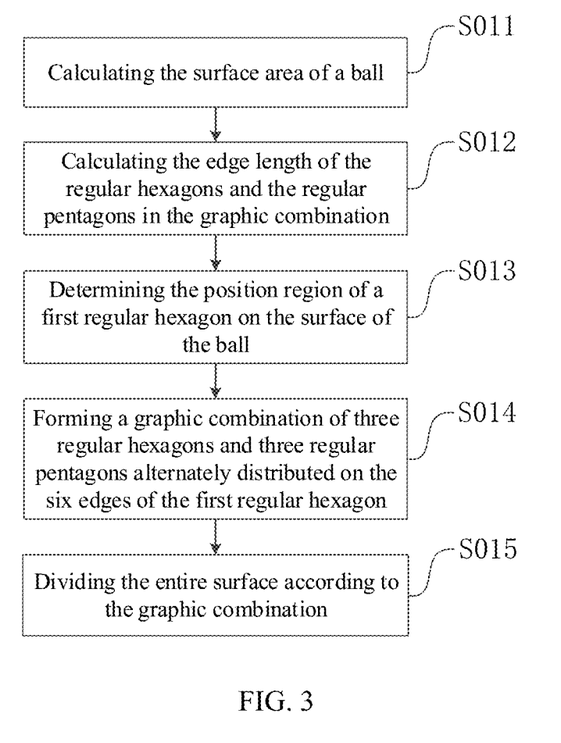
FIG. 3 illustrates a flowchart of dividing a surface of a ball into sub-regions.

Therefore, the figures on the surface of a soccer ball can be selected as a reference for the plurality of sub-regions, that is, the surface of the ball may be divided into a graphic combination of a first quantity of first geometric figures and a second quantity of second geometric figures according to the size of the ball. The first geometric figures in the graphic combination may be regular hexagons, the second geometric figures may be regular pentagons, and the regular hexagons and the regular pentagons may have a same side length. In addition, in the graphic combination, the first quantity may be twenty, and the second quantity may be twelve. Then, the surface of the ball may be divided into a plurality of sub-regions based on the graphic combination. Referring to FIG. 3, step S01 may include steps S011-S015, which are specifically described below.

In step S011, in order to be able to divide the surface of the ball into a plurality of sub-regions, it is necessary to know the surface area of the ball so as to, based on the surface area of the ball, reasonably divide the surface of the ball into the sub-regions according to the determined graphic combination. The surface area of the ball can be obtained through the formula $4\pi R^2$, where R represents the radius of the ball.

In step S012, in order to make the regular hexagons and the regular pentagons in the determined graphic combination completely cover the ball to be used as the capture ball 13, the size of each geometric figure in the graphic combination should be calculated according to the size of the ball. Here, strictly following the surface pattern of the soccer ball, the numbers of the regular hexagons and the regular pentagons of equal edges are set to 20 and 12, respectively. Then, the size of the regular hexagons and the regular pentagons (i.e., the side length of the geometric figure) may be determined through the following formula:

$$4\pi R^2 = 20 \times 2.598 \times x^2 + 12 \times 1.72 \times x^2$$

Where, R represents the radius of the balk, and x represents the side length of the regular hexagon or the regular pentagon. For example, when a ball with a radius of 15 cm is selected as the capture ball 13, the side length of the regular hexagon or the regular pentagon to be distributed on the surface of the ball should be 6.24 cm.

Figure 4:
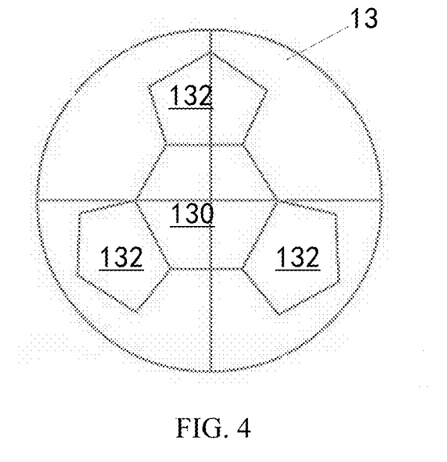
FIG. 4 illustrates a first schematic diagram of a geometric-figure distribution of the capture ball.

In step S013, the positional region of the first regular hexagon may be determined on the surface of the ball. In a specific embodiment. Referring to FIG. 4, an "equatorial line" may be set on the surface of the capture ball 13, and a reference point may be determined on the equator line. The reference point may be taken as a center point of the first regular hexagon 130 to determine the positional region of the first regular hexagon 130.

In step S014, a graphic combination of three regular hexagons and three regular pentagons alternately distributed on the six edges of the first regular hexagon may be formed. In a specific embodiment, referring to FIG. 4 and FIG. 5, by respectively dividing the regions of regular pentagons 132 based on three non-adjacent edges of the first regular hexagon 130 in step S013, and dividing the regions of regular hexagons 131 again based on the other three non-adjacent edges of the regular hexagon, a graphic combination in which three regular hexagons 131 and three regular pentagons 132 are alternately distributed on the six edges of a regular hexagon 130 may be formed. It should be noted that the first regular hexagon 130 and the regular hexagons 131 are regular hexagons with equal edges.

Figure 5:
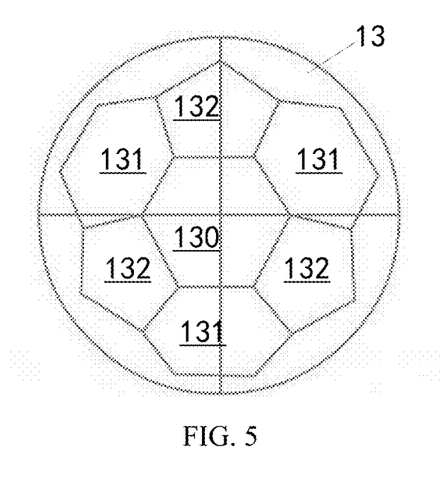
FIG. 5 illustrates a second schematic diagram of a geometric-figure distribution of the capture ball.

In step S015, the entire surface of the ball is divided according to the graphic combination in step S014 until the surface of the ball is completely divided to form twenty regular hexagons 131 and twelve regular pentagons 132.

It should be noted that the process of dividing the geometric figures may include printing, projection, sticker, virtual division and other technical means, and the specific technical means selected here is not limited.

In step S02, reflective marking points may be distributed in the plurality of divided sub-regions, such that the distribution of the distance values between any two reflective marking points may be concentrated. These reflective marking points may be used for optical motion capture of the ball. In a specific embodiment, the reflective marking points of the ball may be distributed at the apexes or the edge-midpoints of the non-adjacent edges of the geometric figures used by the sub-regions, and step S02 may include the following processes.

(1) The apexes of each regular hexagon 131 divided on the surface of the capture ball 13 (it should be understood that the apexes of the regular pentagons 132 may also be selected to achieve the same marking effect) may be marked; or, the edge-midpoints of non-adjacent edges of the divided regular hexagons 131 may be marked. Optionally, the edge-midpoints of the edges shared by any two regular hexagons 131 may be marked.

(2) Each marked apex or each marked edge-midpoint may be set as a reflective marking point, and the formed reflective marking points may be together defined as a point set (the point set of apexes may include 60 reflective marking points, and the point set of edge-midpoints may include 30 reflective marking points), which are used for optical motion capture of the capture ball 13. The process of setting the reflective marking point here may be disposing a reflective sticker at each marked apex or at each marked edge-midpoint to form a reflective marking point.

Those skilled in the art should understand that the present application also protects a capture ball for optical motion capture with 60 reflective marking points or 30 reflective marking points uniformly distributed over the capture ball. When there are 60 reflective marking points on the capture ball, the reflective marking points may be distributed according to the apexes of the regular hexagons formed in steps S01-S02; when there are 30 reflective marking points on the capture ball, the reflective marking points may be distributed at the edge-midpoints of the non-adjacent edges of the regular hexagons formed in steps S01-S04.

In another embodiment, the on-ball point distribution method may not be required for the capture the ball 13, and a soccer ball or a ball similar to a soccer ball may be directly used as the capture ball. At this time, the reflective marking points on the surface of the capture ball may only need to be distributed according to the apex positions of the regular hexagons on the surface of the soccer ball, or according to the edge-midpoint positions of the edges shared by any two regular hexagons on the surface of the soccer ball, thereby saving the on-ball distribution process of steps S01-S04, and providing convenience for practical applications.

In addition, those skilled should also understand that the capture ball 13 obtained by the above-described on-ball point distribution method may not be simply regarded as a rigid body because of the plurality of reflective marking points distributed on its surface, instead, it should be regarded as a capture ball with "impurity points" (i.e., reflective marking points). As such, the process of capturing and recognizing the capture ball 13 may not need to calculate the entire rigid body, but may only need to calculate a sufficient number of "impurity points" to determine the spatial position and the motion posture of the capture ball. However, the introduction of the "impurity points" may also bring corresponding problems. Impurity points according to the traditional meaning may refer to points in the system that are incorrect or should not exist. These points should be excluded in practical applications. However, the "impurity points" of the capture ball 13 considered here may need to be captured, which may require, when recognizing the capture ball, adding a new determination mechanism to identify which "impurity points" belong to the corresponding capture ball, and thus to retain these points. Here, the "impurity points" on the surface of the capture ball 13 may be uniformly distributed, and the number of the types of the distances between each "impurity point" and an adjacent "impurity point" may be small. For example, when there are 60 "impurity points" on the capture ball 13, the closest distance from a point to another point may be equal to the length of the edge, and the distribution may be concentrated; when there are 30 reflective marking points on the capture ball, the closest distance from a point to another point may be a half of the sum of the diagonal and the edge of the regular hexagon, and the distribution may be concentrated. Therefore, according to the closest distance between "impurity points", which points are the "impurity points" of the capture ball that need to be identified can be determined, and thus the problems mentioned in this paragraph can be well solved using the present invention.

According to steps S01-S02, a capture ball that have a uniform distribution of reflective marking points and can be used for optical capture may be obtained. When performing motion-posture recognition on the capture ball in the later stage, it only requires to find 10 or even less matching points on the capture ball to perform motion-posture recognition on the capture ball, thereby greatly reducing the calculation amount of the system and improving the calculation speed of the capturing and tracking process, such that while the real-time posture recognition effect of the capture ball is enhanced, convenience can also be brought to practical applications. In the following, the specific process of performing motion-posture recognition on the captured ball will be described.

Figure 6:
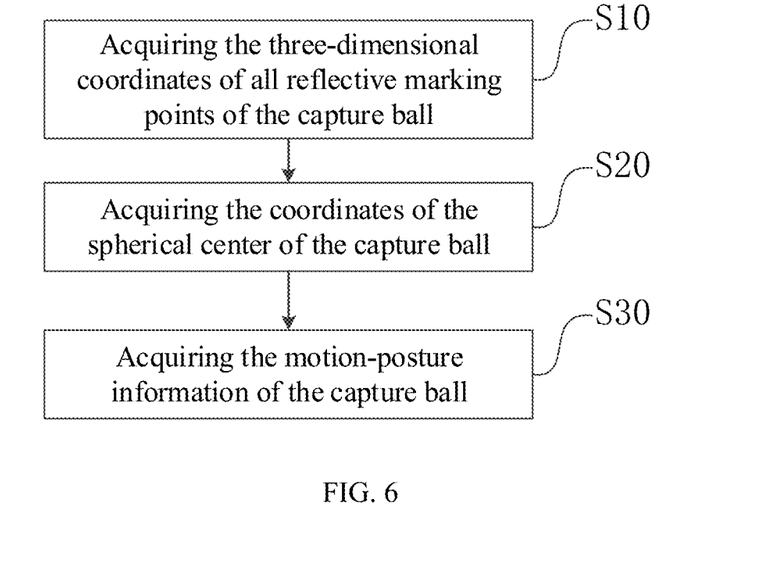
FIG. 6 illustrates a flowchart of a motion-posture recognition method.

Referring to FIG. 6, the present application discloses a motion-posture recognition method for a capture ball, which includes steps S10-S30.

In step S10, three-dimensional coordinates of all reflective marking points in the motion space of the capture ball may be acquired, and a plurality of matching points of the capture ball may be identified. In one embodiment, referring to FIG. 7, step S10 may include steps S11-S16, which are specifically described below.

Figure 7:
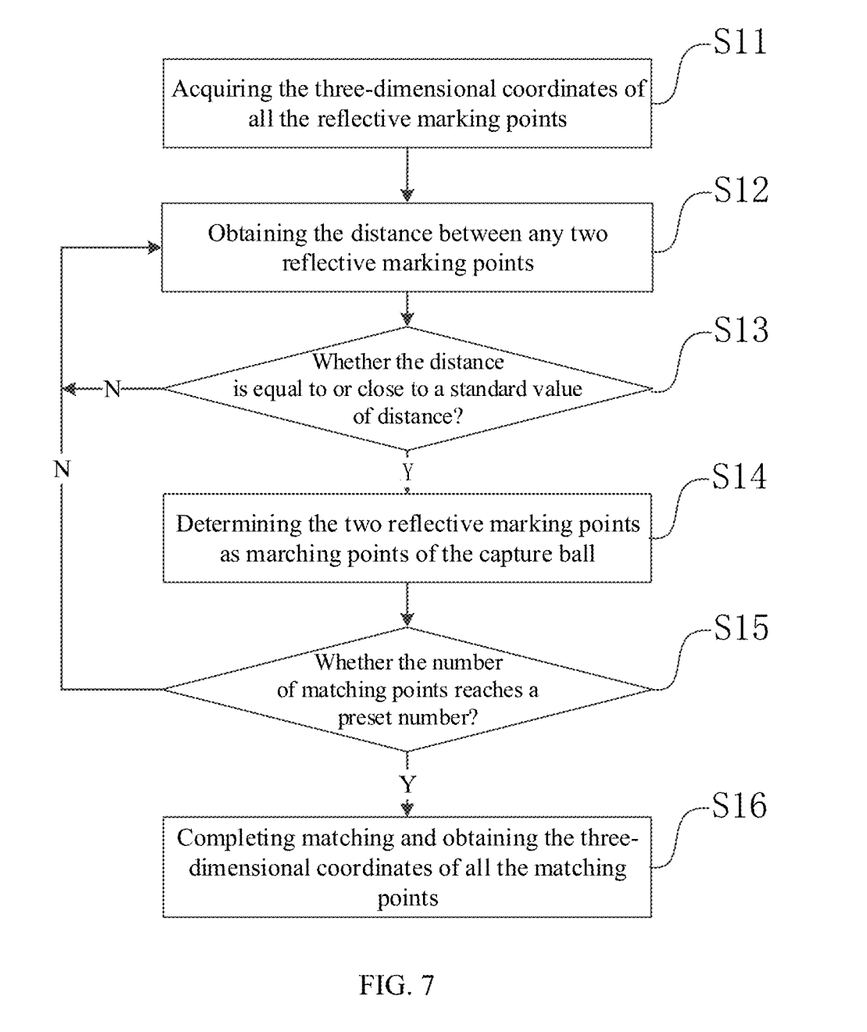
FIG. 7 illustrates a flowchart of acquiring three-dimensional coordinates of matching points.

In step S11, three-dimensional coordinates of all reflective marking points may be acquired according to the two-dimensional coordinates of all reflective marking points in the motion space. The motion space may include other identifiable objects different from the capture ball (i.e., in addition to the reflective marking points on the capture ball, the motion space may also include other reflective marking points on other identifiable objects. The other reflective marking points may be reflective marking points on other capture balls or reflective marking points on other objects to be captured).

Referring to FIG. 1, when the capture ball 13 is freely moving in the motion space, the camera 12 may continuously shoot, and the imaging rate of each infrared camera may be preferentially maintained at 120 frames per second or more. The camera 12 may process the captured motion images to obtain the two-dimensional coordinates of all reflective marking points, and may output the two-dimensional coordinates to the motion-posture reorganization apparatus 11. The motion-posture recognition apparatus 11 may simultaneously acquire the two-dimensional coordinates of the reflective marking points in the plurality of motion images from the camera 12, and calculate the three-dimensional coordinates of all reflective marking points in the motion space according to the acquired two-dimensional coordinates. The process of obtaining the three-dimensional coordinates according to the two-dimensional coordinates here may be a conventional means of image processing, and will not be described in detail herein.

It is necessary to note that all reflective marking points on the surface of the capture ball 13 are distributed according to the on-ball point distribution method in steps S01-S02, such that the distribution of the distance values between any two reflective marking points is concentrated, and thus the goal of uniformly distributing all the reflective marking points is achieved. Optionally, the reflective marking points on the surface of the capture ball 13 may be distributed according to the apex positions of the regular hexagons on the surface of the soccer ball, or according to the edge-midpoint positions of the edges shared by any two regular hexagons on the surface of the soccer ball.

Those skilled in the art should understand that, due to the presence of other reflective marking points in the motion space, the recognition of the capture ball is certainly affected by these other reflective marking points. Therefore, it is necessary to match all the identifiable reflective marking points in the motion space one by one to determine which reflective marking points belong to the capture ball (i.e., the process of identifying the matching points on the capture ball), such that the goal of correctly recognizing the trajectory of the capture all. Correspondingly, the process of matching the reflective marking points may refer to steps S12-S15.

In step S12, the three-dimensional coordinates of any two reflective marking points that are recognizable in step S11 may be compared to obtain a distance between the two reflective marking points.

In step S13, whether the distance obtained in step S12 is equal to or close to a standard value of distance may be determined (i.e., whether the difference between the obtained distance and the standard value of distance is within an error range may be determined), and if yes, step S14 may be processed; otherwise, returning to step S12, two reflective marking points in a next group may be selected for determination.

Those skilled in the art should also understand that the distance from a point to another point on the capture ball may be obtained conventionally, which include three methods: (1) deriving from a formula, which is biased toward theory, and may easily cause error; (2) using a measurement tool to directly measure the distance, which has high precision, but may not be practical for quickly measuring distance; (3) using a method of distance statistics to obtain the distance from a point to another point in the actual optical motion capture environment, which contains the common points of the first two methods, and is also conducive to practical applications. Therefore, in order to achieve a better effect in measuring distances, the present application adopts the third method to statistically obtain the spatial distances between the various reflective marking points of the capture ball in the motion space, and use the distance whose number of occurrences is concentrated in the result of distance statistics as the standard value of distance.

It should be noted that, when the third method is used to obtain the standard value of distance, the process may specifically include: 1) acquiring the three-dimensional coordinates of all reflective marking points on the surface of the capture ball 13 in a testing stage, and the identifiable objects in the motion space in the testing stage may only include the capture ball 13 (there is no other identifiable object, and accordingly, there are no reflective marking points on other identifiable objects); 2) calculating the distances between any two reflective marking points according to the three-dimensional coordinates of all the reflective marking points on the capture ball; 3) counting all obtained distance values, and setting the distance value at which the result of the distance distribution is concentrated as the standard value of distance. It should be noted that in order to ensure the existence of a distance value at which the distribution is concentrated, the reflective marking points configured on the surface of the capture ball should be uniformly distributed, and the specific distribution manner may refer to the on-ball point distribution method described above. Another point to note is that there may be one or more distance values at which the distribution is concentrated, that is, there may be one or more standard values of distance.

In step S14, the two reflective marking points in step S13 may be determined as the reflective marking points on the capture ball 13, and the two reflective marking points may be referred to as matching points of the capture ball 13.

In step S15, whether the number of matching points on the capture ball 13 has reached a predetermined number (when the reflective marking points are at the apexes of the capture ball 13, the predetermined number can be set to any one of 20 to 60, and preferably set to 20; when the reflective marking points are at the edge-midpoints of the capture ball, the predetermined number can be set to any one of 10 to 40, and preferably set to 10) may be determined, and if yes, step S16 may be processed; otherwise, returning to step S12, a next set of reflective marking points may be selected for determination.

Figure 8:
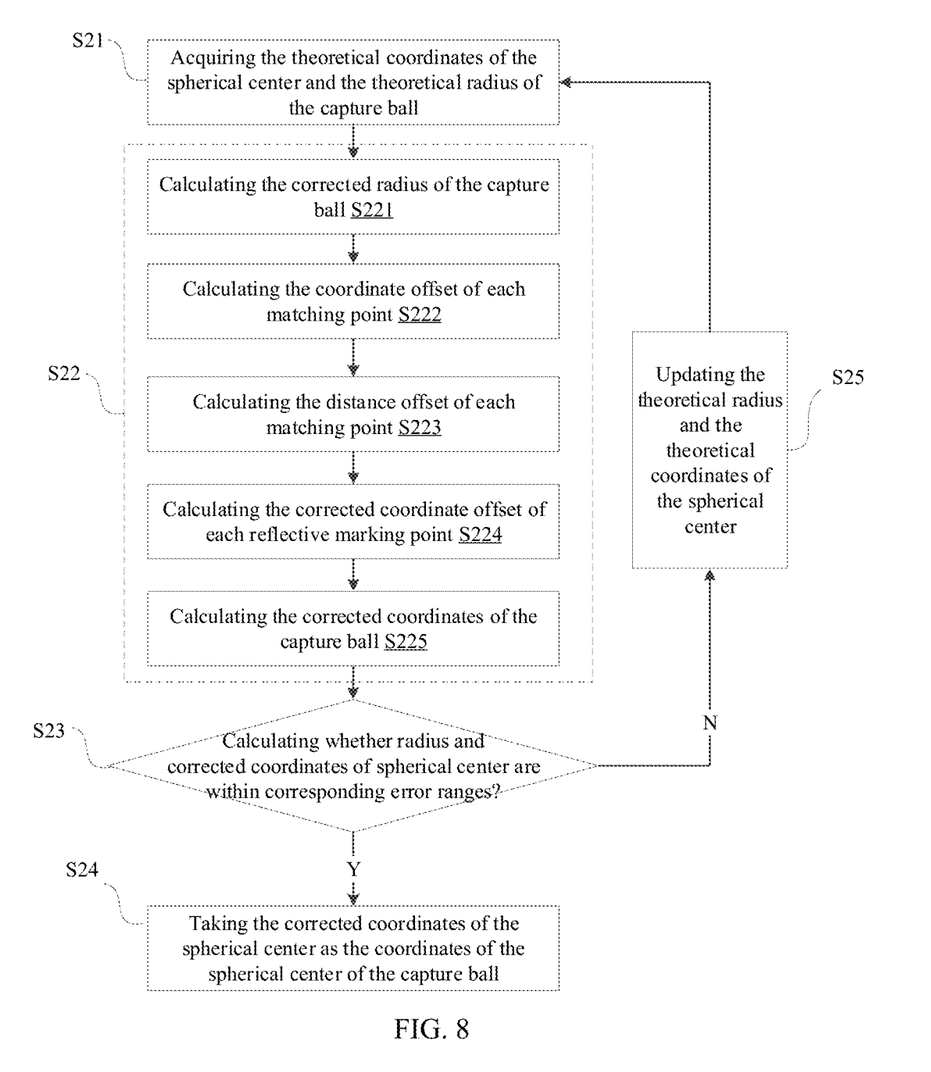
FIG. 8 illustrates a flowchart of acquiring coordinates of a spherical center.

In step S20, the coordinates of the spherical center of the capture ball 13 may be obtained according to the three-dimensional coordinates of the matching points on the capture ball 13 in step S10. In one embodiment, as shown in FIG. 8, the three-dimensional coordinates of each matching point may be input into an iterative algorithm to obtain the coordinates of the spherical center of the capture ball 13. The iterative algorithm involved here can be explained by sub-steps S21-S25 of step S20, and the details are as follows.

In step S21, the average value of the three-dimensional coordinates of each matching point may be calculated to obtain the theoretical coordinates of the spherical center of the capture ball 13. In one embodiment, the three-dimensional coordinates of the matching points are denoted by P1 (X1, Y1, Z1), P2 (X2, Y2, Z2), Pn (Xn, Yn, Zn), and the theoretical coordinates of the spherical center of the capture ball 13 are denoted by Q0 (K01, K02, K03). Then, Q0 may be obtained through the following formula.

$$K01=(X1+X2\ldots+Xn)/n$$

$$K02=(Y1+Y2\ldots+Yn)/n$$

$$K03=(Z1+Z2\ldots+Zn)/n$$

where n represents the number of matching points identified on the capture ball 13.

In addition, it is also necessary to obtain the theoretical radius R0 of the capture ball 13. During the first iteration calculation, this theoretical radius may be considered as the actual radius of the capture ball 13 obtained through measurements.

In step S22, a corrected radius of the capture ball 13 and corrected coordinates of the spherical center may be calculated according to the theoretical coordinates Q0 of the spherical center of the capture ball 13. The specific process may include steps S221-S225, which are respectively described below.

In step S221, the distance from each matching point to the theoretical coordinates Q0 of the spherical center may be obtained according to the three-dimensional coordinates of the matching points and the theoretical coordinates Q0 of the spherical center in step S10, and the distance of each matching point to the theoretical coordinates Q0 of the spherical center may be averaged to obtain a corrected radius R1 of the capture ball. In one embodiment, the distances from P1, P2 . . . Pi . . . Pn to Q0 may be D1, D2 . . . Di . . . Dn (i is an arbitrary integer the range from 1 to n), respectively, and then R1=(D1+D2+ . . . +Dn)/n.

In step S222, for each matching point, the three-dimensional coordinates of the matching point may be compared with the theoretical coordinates Q0 of the spherical center to obtain a coordinate offset Mi of the matching point (i is an arbitrary integer in the range from 1 to n). In one embodiment, the coordinate offsets Mi of the reflective marking points can be expressed as M1 (X1-K01, Y1-K02, Z1-K03), M2 (X2-K01, Y2-K02, Z2-K03), Mi (Xi-K01, Yi-K02, Zi-K03) Mn (Xn-K01, Yn-K02, Zn-K03).

In step S223, for each matching point, the distance from each matching point to the theoretical coordinates Q0 of the spherical center may be subtracted by a preset radius to obtain the distance offset Wi of the reflective marking point (i is an arbitrary integer in the range from 1 to n). The preset radius here may include the theoretical radius R0 of the capture ball 13 or the corrected radius R1. In one embodiment, each distance offset can be expressed as W1=R1-D1, W2=R1-D2, . . . Wi=R1-Di . . . , Wn=R1-Dn; Then, in another embodiment, each distance offset can be expressed as W1=R0-D1, W2=R0-D2, Wi=R0-Di . . . , Wn=R0-Dn.

It should be noted that the theoretical radius R0 here is the measured value of the capture ball 13, which has been entered in the system in advance, and the value is updated in step S25.

In step S224, for each matching point, the coordinate offset Mi of the matching point Pi may be multiplied by its corresponding distance offset Wi to obtain a corrected coordinate offset Pi' of the matching point Pi, and the corrected coordinate offset of each matching point may be averaged to obtain a corrected offset C of the theoretical coordinates Q0 of the spherical center of the capture ball 13. In one embodiment, the corrected coordinate offset of each matching point can be expressed as P1'=M1×W1, P2'=M2×W2, . . . Pi'=Mi×Wi . . . , Pn'=Mn×Wn, and then C may be expressed as:

$$C=(P1'+P2'\ldots Pi'\ldots+PN')/n$$

In step S225, the theoretical coordinates Q0 of the spherical center of the capture ball 13 and the coordinate offset C of the theoretical coordinates of the spherical center may be added together to obtain a corrected coordinates Q1 of the spherical center of the capture ball 13, which is specifically expressed as $$Q1=Q0+C$$

In step S23, the corrected radius R1 of the capture ball 13 may be compared with the theoretical radius R0 to determine whether the difference between the calculated radius R1 and the actual radius R0 is within a radius error range set by the user; the corrected coordinates Q1 of the spherical center of the capture ball 13 may be compared with the theoretical coordinates Q0 of the spherical center to determine whether the difference between the corrected coordinates Q1 of the spherical center and the theoretical coordinates Q0 of the spherical center is within a coordinate error range set by the user. If the results of both determinations are yes, step S24 may be processed, and if not, step S25 may be processed.

In step S24, the corrected coordinates Q1 of the spherical center of the capture ball 13 may be taken as the coordinates of the spherical center of the capture ball 13, and at this time, it may be considered that the system completes the optimization for the center point of the capture ball 13.

In step S25, the value of the theoretical radius R0 of the capture ball 13 may be updated to the corrected radius R1, and the value of the theoretical coordinates Q0 of the spherical center of the capture ball 13 may be updated to the corrected coordinates Q1 of the spherical center. Then, returning to step S21, the corrected radius of the captured ball and the corrected coordinates of the spherical center may be recalculated until the comparison result of the corrected radius of the capture ball 13 and the updated theoretical radius R0 as well as the comparison result of the corrected coordinates of the spherical center of the capture ball 13 and the updated theoretical coordinates Q0 of the spherical center are both within the corresponding error ranges (i.e., until entering step S24).

In step S30, the motion-posture information of the capture ball in the motion space may be obtained according to the three-dimensional coordinates of each matching point and the coordinates of the spherical center of the capture ball. In one embodiment, referring to FIG. 9, step S30 may include steps S31-S33, which are specifically described as follows.

Figure 9:
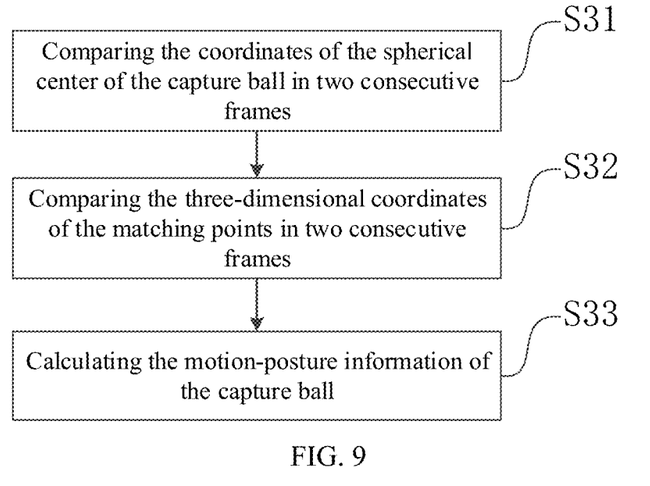
FIG. 9 illustrates a flowchart of acquiring motion-posture information.

In step S31, the coordinates Q1 of the spherical center of the capture ball 13 obtained according to the current frame (obtained from step S24) may be compared with the coordinates of the spherical center of the capture ball 13 obtained according to the previous frame to obtain displacement information of the capture ball 13. In one embodiment, the process of acquiring the coordinates of the spherical center of the capture ball 13 of the previous frame may refer to step S20, and details are not described herein.

It should be noted that the coordinates Q1 of the spherical center may be a measure of the position of the capture ball 13 in the motion space. When the coordinates Q1 of the spherical center are changed, it means that the position of the capture ball 13 is changed, and the displacement distance and the displacement direction of the capture ball 13 in the motion space may be represented by the changing amount of the coordinates Q1 of the spherical center in the X, Y, and Z directions.

In step S32, the three-dimensional coordinates Pi of each matching point obtained according to the current frame may be compared with the three-dimensional coordinates of the corresponding matching points according to the previous frame to obtain the posture information of the capture ball 13. In one embodiment, the process of obtaining the three-dimensional coordinates of the corresponding matching points of the previous frame may refer to step S10, and details are not described herein.

It should be noted that the time interval between the current frame and the previous frame may be very small, and can even be about 1 ms. Therefore, the capture ball 13 can be considered as having a very small posture change during this time period, and each matching point can be considered as experiencing a very small position change during this time period. Therefore, a matching point that slightly changes from the three-dimensional coordinates of the current time can be regarded as the corresponding matching point of the previous frame.

In addition, the three-dimensional coordinates Pi of any matching point may be a measure of the position of the matching point. When the three-dimensional coordinate Pi are changed, it means that the posture of the capture ball 13 is changed, and the posture change distance and the posture change direction of the capture ball 13 in the motion space may be represented by the changing amount of the three-dimensional coordinates Pi in the X, Y, and Z directions.

In step S33, the displacement information and the posture information of the capture ball 13 may be taken as the motion-posture information of the capture ball 13 in the motion space, and the motion-posture information may include the displacement change amount and the posture change amount of the capture ball 13.

In view of this, the motion-posture recognition method for a capture ball disclosed in steps S10-S30 of the present application has the following advantages: (1) Inspired from the surface structure of a soccer ball, point distribution on ball-like target objects may be ensured, such that uniformity and practicality of reflective marking points can be achieved, which is conducive to realizing the capture and motion-posture recognition of such target objects; (2) The concept of "impurity point" tracking is cited to avoid the problem that capturing and tracking a target object can only achieved by calculating the entire rigid body; instead, as long as there is a proper amount of "matching points", we can determine the motion state of the target object, which greatly reduces the amount of calculation and improves the operating efficiency of the system.

Figure 10:
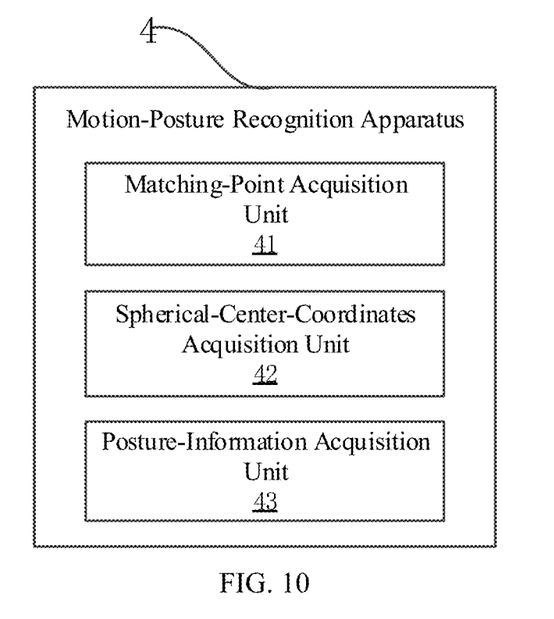
FIG. 10 illustrates a schematic structural view of a motion-posture recognition apparatus.

Those skilled in the art should understand that the present application also protects a motion-posture recognition apparatus for a capture ball. As shown in FIG. 10, the motion-posture recognition apparatus 4 may include:

a matching-point acquisition unit 41, configured to acquire the three-dimensional coordinates of each matching point on the capture ball 13 in the motion space. The process of the matching-point acquisition unit 41 acquiring the coordinates of the matching points on the capture ball 13 in the motion space may refer to step S10, which is not specifically described herein again.

a spherical-center-coordinates acquisition unit 42, configured to acquire the coordinates of the spherical center of the capture ball 13 according to the three-dimensional coordinates of the matching points. The spherical-center-coordinates acquisition unit 42 may input the three-dimensional coordinates of the matching points into an iterative algorithm to obtain the coordinates of the spherical center of the capture ball. For the specific process, reference may be made to step S20, which is not specifically described herein.

a posture-information acquisition unit 43, configured to obtain the motion-posture information of the capture ball 13 in the motion space according to the three-dimensional coordinates of the matching points and the coordinates of the spherical center of the capture ball. For the specific process, reference may be made to step S30.

Moreover, those skilled in the art should understand that the optical motion capture system illustrated in FIG. 1 may include a plurality of infrared cameras 12 and a motion-posture recognition apparatus 11, and the motion-posture recognition apparatus 11 can preferably employ the motion-posture recognition apparatus 4 illustrated in FIG. 10.

Those skilled in the art should clearly understand that, for convenience and brevity of description, the illustration is only based on the division of the functional units and modules described above. In practical applications, according to needs, the above functions may be assigned to different functional units, modules to complete. That is, the internal structure of the device may be divided into different functional units or modules to complete all or part of the functions described above. In addition, the specific names of the functional units and modules are only for the purpose of distinguishing between each other easily, and are not intended to limit the scope of protection of the present application.

Those of ordinary skill in the art should understand that units and algorithm steps of the various examples described in connection with the embodiments disclosed herein can be implemented in electronic hardware or a combination of computer software and electronic hardware. Whether these functions are implemented by hardware or software depends on the specific application and design constraints of the technical scheme. Those skilled in the art can use different methods for implementing the described functions for each particular application, but such implementation should not be considered to be beyond the scope of the present invention.

Figure 11:
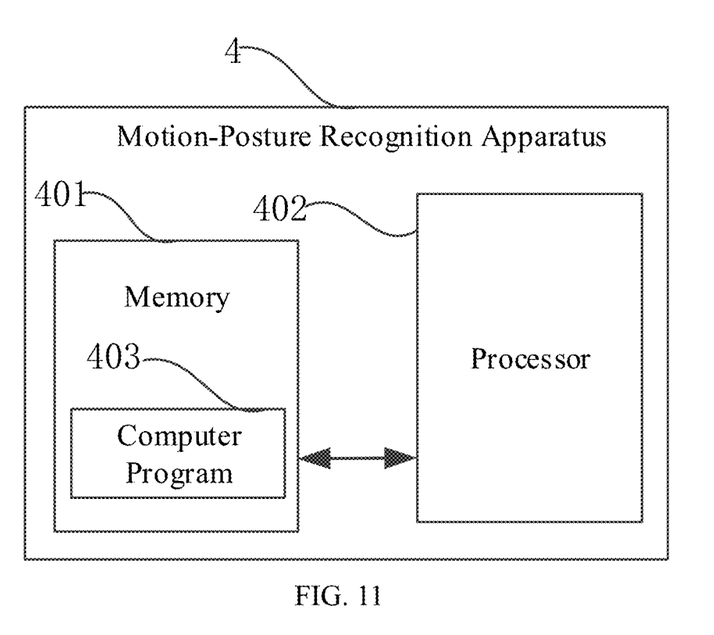
FIG. 11 illustrates a schematic structural view of another motion-posture recognition apparatus.

Moreover, each functional unit in the motion-posture recognition apparatus 4 protected by the present application may be integrated into one processing unit, or each unit may exist physically separated, or more than two units may be integrated into one unit. The above integrated unit can be implemented in the form of hardware or in the form of a software functional unit. Accordingly, the present application also protects another motion-posture recognition apparatus 4, referring to FIG. 11, which includes a memory 401, a processor 402, and a computer program 403. The memory 401 is used for storing the computer program 403, and when the computer program 403 is executed by the processor 402, the method shown in the above steps S10-30 can be implemented.

Those skilled in the art should understand that all or part of the functions of the various methods in the above embodiments may be implemented by hardware or by a computer program. When all or part of the functions in the above embodiments are implemented by a computer program, the program may be stored in a computer readable storage medium, and the storage medium may include: a read only memory, a random access memory, a magnetic disk, an optical disk, a hard disk, etc. A computer executes the program to implement the above functions. For example, the program is stored in a memory of a device, and when the program in the memory is executed by a processor, all or part of the above functions can be realized. In addition, when all or part of the functions in the above embodiments are implemented by a computer program, the program may also be stored in a storage medium such as a server, another computer, a magnetic disk, an optical disk, a flash disk or a mobile hard disk, and may be saved to a memory of the local device through downloading or copying, or through updating the version of the system of the local device. When the program in the memory is executed by the processor, all or part of the functions in the above embodiments may be implemented.

The invention has been described above with reference to specific examples, which are merely intended to facilitate the understanding of the invention and are not intended to limit the invention. For those skilled in the art to which the present invention pertains, in accordance with the principles of the present invention, it is also possible to make a number of simple derivations, variants or replacements.

What is claimed is:

1. An on-ball point distribution method used for optical motion capture, comprising:
   dividing a surface of a ball into a plurality of sub-regions by performing:
      according to a size of the ball, dividing the surface of the ball into a graphic combination of a first quantity of first geometric figures and a second quantity of geometric figures, wherein dividing the surface of the ball comprising:
         determining a reference point on an equatorial line of the surface of the ball, using the reference point as a center point of a first regular hexagon to determine a positional region of the first hexagon, and forming a graphic combination in which three regular hexagons and three regular pentagons are alternately distributed on six edges of a regular hexagon by respectively dividing the regular pentagons based on three non-adjacent edges of the first regular hexagon, and dividing the regular hexagons again based on the other three non-adjacent edges of the first regular hexagon, and forming the twenty regular hexagons and the twelve regular pentagons until the surface of the ball is completely divided; and
   distributing reflective marking points in the plurality of sub-regions such that a distribution of distance values between any two reflective marking points is concentrated, wherein the reflective marking points are used for the optical motion capture of the ball.

2. The on-ball point distribution method according to claim 1, wherein:
   the first geometric figures are regular hexagons, the second geometric figures are regular pentagons, and the regular hexagons and the regular pentagons have a same side length.

3. The on-ball point distribution method according to claim 2, wherein according to the size of the ball, dividing the surface of the ball into the first quantity of first geometric figures and the second quantity of second geometric figures further includes:
   according to a diameter or a radius of the ball, calculating a surface area of the ball; and
   according to a total area of the graphic combination equal to the surface area of the ball, calculating the side length of the regular hexagons and the regular pentagons.

4. The on-ball point distribution method according to claim 1, wherein:
   the first quantity is twenty, and the second quantity is twelve.

5. The on-ball point distribution method according to claim 1, wherein distributing the reflective marking points in the plurality of sub-regions includes:
   distributing the reflective marking points of the ball at apexes or edge-midpoints of each geometric figure.

6. The on-ball point distribution method according to claim 5, wherein distributing the reflective marking points of the ball at the apexes or edge-midpoints of each geometric figure includes one of:
   distributing the reflective marking points of the ball at the apexes of the regular hexagons; and
   distributing the reflective marking points of the ball at the midpoints of non-adjacent edges of the hexagons.

7. A capture ball for optical motion capture, wherein a plurality of reflective marking points is distributed on the capture ball, and each reflective marking point is obtained through the on-ball point distribution method according to claim 1.

8. An optical motion capture system, comprising:
   a capture ball including the capture ball of claim 7;
   a plurality of cameras, configured to capture motion images of the capture ball in a motion space during a movement process; and
   a motion-posture recognition apparatus, communicatively coupled to the plurality of cameras, and configured to perform motion-posture recognition on the capture ball based on the motion images.

9. A non-transitory computer storage medium, including a program, wherein the program is executed by a processor to implement the method according to claim 1.

* * * * *